L. M. KARNASCH.
PRESSURE REGULATING APPARATUS.
APPLICATION FILED MAR. 14, 1914.

1,243,073.

Patented Oct. 16, 1917.
4 SHEETS—SHEET 1.

WITNESSES:
H. G. Prost.
J. B. Gardner

INVENTOR.
L. M. KARNASCH
BY Miller & White
ATTORNEYS.

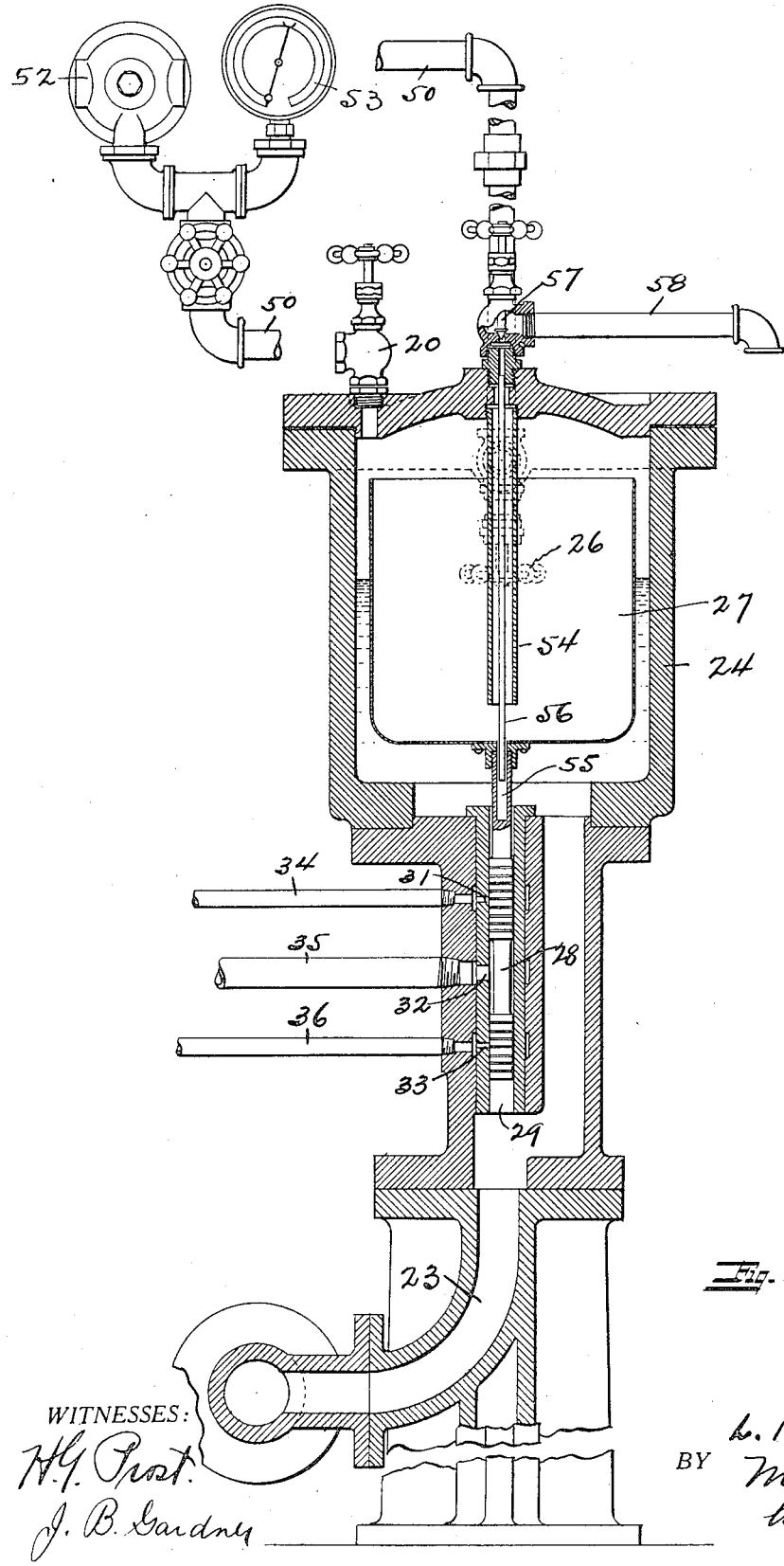

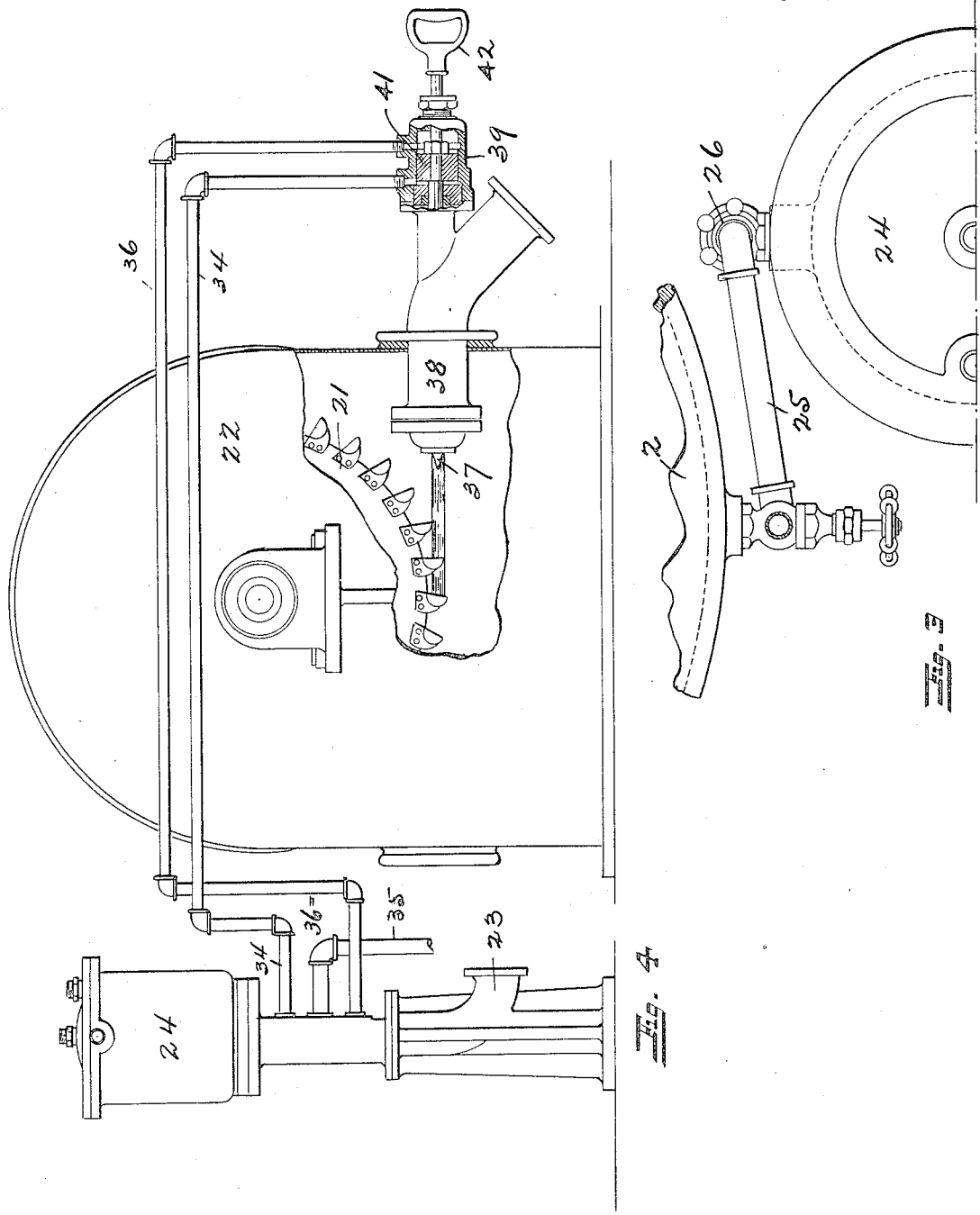

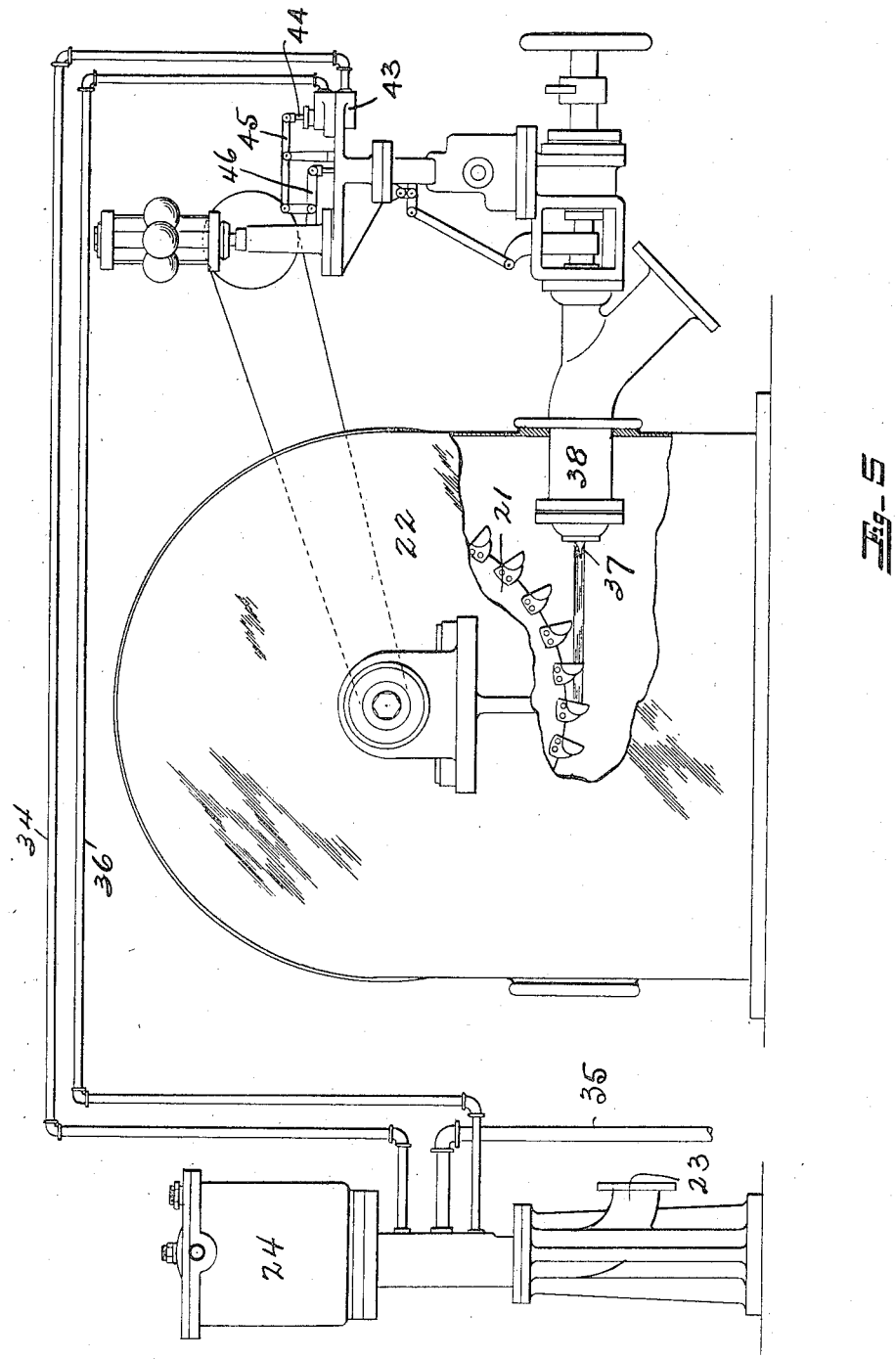

UNITED STATES PATENT OFFICE.

LEOPOLD M. KARNASCH, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

PRESSURE-REGULATING APPARATUS.

1,243,073.  Specification of Letters Patent.  Patented Oct. 16, 1917.

Application filed March 14, 1914. Serial No. 824,663.

*To all whom it may concern:*

Be it known that I, LEOPOLD M. KARNASCH, a subject of the Empire of Germany, and a resident of the city and county of San Francisco, State of California, have invented certain new and useful Improvements in Pressure-Regulating Apparatus, of which the following is a specification.

The invention relates to an apparatus for maintaining a fluid supply under substantially constant pressure and is particularly designed, although not in any sense limited, to maintain the oil which is used in conjunction with the governors of tangential water wheels under substantially constant pressure.

The object of the invention is to provide an apparatus for maintaining a supply of fluid under substantially constant pressure.

Another object of the invention is to provide an apparatus for maintaining a supply of fluid from which the fluid is constantly or intermittently flowing under substantially constant pressure which is not operable directly by variations in pressure of the fluid.

A further object of the invention is to provide an apparatus for maintaining a supply of fluid under substantially constant pressure which is operable by variations in level of the fluid.

The invention possesses other advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description, as I may adopt many variations within the scope of my invention as set forth in said claims.

Referring to said drawings:

Fig. 2 is a vertical section of the regulating means which is operative by variations in the level of the fluid.

Fig. 3 is a plan view of the upper connection between the pressure tank and the container for the regulating means.

Fig. 4 is an elevation of one form of connection between the regulating means and the prime mover for the fluid pump.

Fig. 5 is an elevation of a modified form of connection in which the regulating means is connected indirectly to the pump prime mover through a governor.

Figure 1:
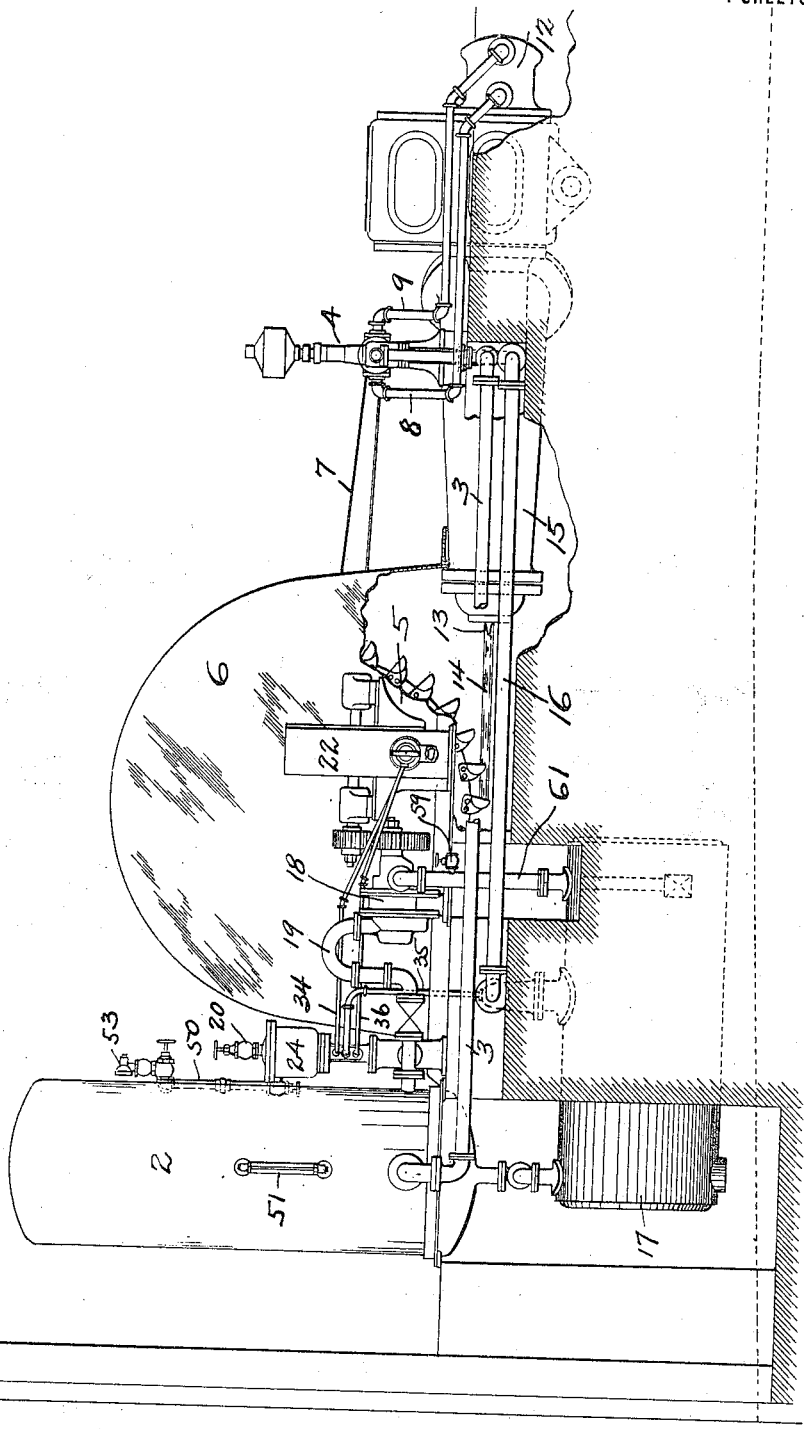
Figure 1 is a view of the complete apparatus as used in connection with a governor for controlling the size of the water jet in a tangential water wheel installation.

The apparatus of the invention is particularly designed to be used in connection with the governors of water wheels and in the present instance I have shown it as used in connection with the governor of a tangential water wheel. The fluid under pressure is employed for varying the amount of water projected against the wheel in accordance with the variations in load on the wheel, either by deflecting the water jet to or from the wheel or by varying the size of the jet. The flow of the operating fluid, which is preferably oil, is controlled by a governor which is driven by the water wheel and which operates by variations in speed of the water wheel, caused by variations in load, to cause variations in the amount of water projected against the wheel. The operating fluid is maintained under a pressure of several hundred pounds to the square inch, a pressure which introduces entirely different problems than ordinary pressures and it is essential to the proper operation of the governor that this pressure be maintained substantially constant. Under these conditions of operation, means controlled by variations in pressure for maintaining the pressure substantially constant are impractical and other means of control must be used.

Heretofore this has been accomplished by pumping oil continuously into the pressure tank and maintaining a constant pressure therein by means of an automatic by-pass between the tank and the pump. This by-pass comprises a very small aperture through which the oil passes at an exceedingly high velocity, which heats the oil to a high temperature and also causes it to assume a butter-like form, both of which effects are objectionable to the proper operation of the governor.

The load on the water wheel is generally of a constantly varying nature and consequently the flow of oil from the storage tank to the jet control operating means is continuous and variable. The apparatus of my invention operates to maintain a constant pressure of the oil in the pressure tank regardless of the amount of oil being used to operate the jet controlling means.

In the following description I shall describe the apparatus as used in connection with the governing mechanism of a tangential water wheel, but it is to be understood that the apparatus for maintaining the supply of fluid under substantially constant pressure is not limited to use in connection with water wheel governors.

The oil is maintained under substantially constant pressure in the pressure tank 2 from which it flows through the pipe 3 to the governor 4 which is driven by the water wheel 5 inclosed in the housing 6, by means of the belt 7. The governor 4 is connected by means of the pipes 8—9 with the opposite ends of a cylinder 12 in which is arranged a piston which is attached to the stem of the needle 13, which is movable to control the size of the jet 14 issuing from the nozzle 15, which jet is directed against the buckets of the water wheel 5. The governor operates to allow the oil under pressure to flow to the cylinder 12 through either of the pipes 8 or 9 depending upon whether the size of the jet is to be increased or decreased. Assuming that the load on the water wheel has decreased, the wheel consequently increases in speed slightly and this increase in speed operates the governor to allow the oil to flow through conductor 9 to the cylinder 12, thereby causing the needle to be moved to lessen the jet and thereby decrease the speed of the wheel. The oil from the other side of the cylinder passes through the conductor 8, the governor 4 and the discharge pipe 16 to the sump tank 17. These water wheels are usually employed for driving electric generators, the speed of which must be maintained constant regardless of variations of the load thereon, so that the governor must operate to produce variations in the size of the jet with accuracy.

The oil is forced into the pressure tank 2 through the pipe 19 by the pump 18 which draws its supply from the sump tank 17. The pump 18 shown in the drawings is a gear pump capable of pumping against very high pressures. The pump is driven by any suitable prime mover, such as the water wheel 21 inclosed in the housing 22, and the pressure in the pressure tank 2 is controlled by varying the speed of the prime mover. Since the prime mover for the pump in the present instance is a tangential water wheel, I will hereinafter designate it as such, but it is understood that the water wheel is but one form of prime mover which may be used.

Connected to the pressure tank 2 by a conductor 23 which communicates with the pressure tank adjacent the bottom is a float chamber 24, which is also connected to its upper end with the pressure tank by means of a conductor 25 provided with a valve 26. The float chamber is also provided at its upper end with a valve 20. Arranged in the float chamber is a float 27 comprising a shell, open to the air at its upper end, so that the pressures on the inside and outside of the float are substantially equal. On account of the high pressures obtaining in the float chamber, the use of a closed float would be practically impossible, since if such float were made sufficiently strong to withstand the crushing pressure, its weight would be such that it would not operate as a float. Connected to the bottom of the float 27 is a double piston 28 which is slidable in the cylinder 29. The cylinder is open at both ends and is in communication with the oil under pressure in the conductor 23 and the float chamber 24. Arranged in the cylinder are three ports 31, 32 and 33 to which are connected respectively the pipes 34, 35 and 36, the pipe 35 extending to the sump tank 17. As the float 27 rises or lowers, due to variations in level of the oil in the float chamber, either of the ports 33 or 31 is brought into communication with the oil under pressure and the other port is brought into communication with the discharge port 32. For example, when the float lowers, port 31 is uncovered and placed in communication with the oil in the float chamber and port 33 is uncovered and placed in communication with port 32.

The pipes 34 and 36 extend to the prime mover for the pump, and the flow of oil through the pipes 34 and 36 effects the control of the pump motor, which is shown as a water wheel 21. The oil under pressure may be employed for directly or indirectly controlling the amount of water projected against the water wheel 21, either by causing a movement of the nozzle or a variation in the size of the jet. In the construction shown in Fig. 4, the oil is employed to directly produce a movement of the needle 37 arranged in the nozzle 38. Surrounding the needle stem is a cylinder 39 in which is disposed the piston 41 which is attached to the needle stem. The pipes 34 and 36 are connected to the cylinder at the opposite ends and the flow of oil through the pipes controls the size of the jet issuing from the nozzle and consequently the rate at which oil is being pumped into the pressure tank. The water wheel 21 which drives the pump 18 is usually a small unit in which the operation of the nozzle may be controlled by hand, in which event a handle 42 may be arranged on the end of the needle stem.

Instead of causing the flow of the oil in pipes 34 and 36 to directly vary the size of the jet issuing from the nozzle 38, the nozzle may be provided with a governor, whose operation is affected by the flow of oil under pressure. The governor is connected to the needle 37 and to the wheel 21 in the usual way. Arranged on the governor is a cylinder 43 with which the pipes 34 and 36 communicate at the lower and upper portions respectively. Arranged in the cylinder between the two ports is a piston provided with a piston rod 44 projecting from the cylinder. The piston rod 44 is pivoted to a lever 45 fulcrumed on the governor frame and the other end of the lever 45 is linked to the floating lever 46 forming part of the fly ball governor mechanism. The connection is such that when the piston rod 44 is raised the needle is moved backward to increase the size of the jet and when the piston rod 44 is depressed, the needle moves forward to decrease the size of the jet or to stop it entirely. The operation of the oil pump is, therefore, controlled directly by the level of the oil in the pressure tank or float chamber. By varying the speed of the pump, the rate at which oil is being pumped into the pressure tank is varied, and since the speed of the pump is controlled by variations in the oil level in the tank, the pump operates to introduce oil at substantially the same rate as it is being withdrawn, so that the level of the oil in the pressure tank remains constant. The pressure tank is filled with oil at its lower portion and with air under pressure at its upper portion, and since the air is not absorbed by the oil, the pressure within the tank varies with variations in oil level, and consequently, if the oil level is maintained substantially constant, the pressure in the tank remains substantially constant.

The float chamber is positioned with relation to the tank so that the normal oil level occurs about midway of the height of the float chamber and the pressure tank is provided with a gage glass 51 which indicates the oil level. Connected to the float chamber by means of the pipe 50 is a relief valve 52 and a pressure gage 53; the pressure gage indicating the pressure in the tank and the relief valve operating to relieve the pressure when it passes a certain predetermined maximum. Depending into the float chamber 24 is a tube 54, which is arranged to contact with the bottom of the float 27 and arrest its upward movement before the upper edge of the float contacts with the top of the float chamber. Arranged within the tube 54 and extending into a well 55 formed in the piston 28 is a tube or conduit 56, which is provided at its upper end with a needle valve 57. The object of the tube 56 is to provide a drain for removing from the float any oil which may accumulate therein. The oil is forced through the conduit 56 by the pressure within the float chamber and is discharged through the drain pipe 58.

It is sometimes necessary to adjust the weight of the float in order that it may occupy the proper position to perform its functions. This is accomplished by loading the float with oil and then slowly removing the oil through the conduit 56, until the desired balance is obtained. This is accomplished by closing the valve 26, thereby cutting off communication between the upper portion of the float chamber and the upper portion of the pressure tank and then opening valve 20. This allows the air in the float chamber to escape and allows the oil level therein to rise so that the oil may pour into the float. The valve 20 is then closed and valve 26 is again opened, causing the oil in the float chamber and pressure tank to assume the same levels. The needle valve 57 is then opened to cause the oil in the float to be slowly discharged. With the oil pump in operation, the pressure gage 53 is watched and when the pump stops at the desired pressure, the needle valve is closed and the float is then properly balanced.

In starting up the plant, the pressure tank 2 is filled with oil until the float is raised a sufficient distance to shut off the supply of water to the water wheel 21. Air is then pumped into the tank by suitable means, such as an air-compressor, not shown, until the desired pressure is obtained, and the relief valve 52 begins to blow-off. The air compressor is then only operated occasionally to compensate for possible air leakage, which is indicated by the pressure gage 53. The additional air to compensate for any possible leakage may be supplied by arranging a cock 59 on the suction pipe 61 of the oil pump 18, and opening this cock to allow air to be forced into the pressure tank with the oil.

I claim:

1. The combination with a vessel adapted to contain liquid under pressure, of a pump for introducing said liquid into said vessel, means for driving said pump, a float arranged to be moved by variations in the level of the liquid in said vessel, and means operative by the movement of said float for varying the speed of said pump driving means.

2. The combination with a vessel adapted to contain liquid under pressure, of means for introducing the liquid into said vessel, a float arranged to be moved by variations in the level of the liquid in said vessel, and means operative by the movement of the float for varying the speed of said liquid introducing means, whereby the pressure in the vessel remains substantially constant.

3. The combination with a vessel adapted to contain liquid under pressure, of a pump for introducing the liquid into said vessel, a prime mover for driving said pump, means operative by the liquid under pressure for varying the speed of the prime mover, a float arranged to be moved by variations in the level of the liquid in said vessel, and means engaging said float adapted to control the passage of the liquid under pressure to said speed varying means.

4. The combination with a vessel adapted to contain liquid and air under pressure, of a pump for introducing the liquid into said vessel, means for driving said pump, means for varying the speed of said pump driving means, a float arranged to be moved by variations in the level of the liquid in said vessel, a piston valve attached to said float, and conductors connecting said liquid under pressure with said speed varying means, the connections between said conductors and said supply of liquid under pressure being controlled by said piston.

5. The combination with a vessel adapted to contain liquid and air under pressure, of a pump for introducing the liquid into said vessel, means for driving said pump, and means operable by variations in level of the liquid in said vessel for varying the speed of said pump.

6. The combination with a vessel adapted to contain liquid under pressure, of a pump for introducing the liquid into said vessel, means operated by said liquid under pressure for varying the speed of the pump and means operated by variations in level of the liquid in said vessel for varying the flow of liquid from said vessel to said speed varying means.

7. The combination with a vessel adapted to contain liquid under pressure of mechanism adapted to be operated by said liquid, a conductor connecting said vessel and mechanism, means for introducing liquid under pressure into said vessel, and means operative by variations of the level of the liquid in said vessel to vary speed of operation of said introducing means.

8. The combination with a vessel adapted to contain liquid under pressure, of mechanism adapted to be operated by said liquid, a conductor connecting said vessel and said mechanism through which the liquid passes to said mechanism, a pump adapted to introduce liquid under pressure into said vessel, a float arranged to be moved by variations in the level of the liquid in the vessel, and means operative by the movement of said float for varying the speed of said pump.

9. The combination with a vessel adapted to contain liquid under pressure, of mechanism adapted to be operated by said liquid, a conductor connecting said vessel and said mechanism through which the liquid passes to said mechanism, a pump arranged to introduce liquid into said vessel, means for driving said pump, means operated by the liquid under pressure for varying the speed of said pump driving means, and means operative by variations in the level of the liquid in said vessel for controlling said speed varying means.

10. The combination with a water wheel and a nozzle therefor, of a governor connected to said wheel, liquid operated means for varying the amount of water discharged against said wheel, means operative by the governor for controlling the flow of liquid under pressure to said liquid operated means, a tank containing said liquid under pressure, a conductor connecting said tank and said controlling means, means for introducing liquid under pressure into said tank, and means operative by variations of the level of the liquid in said tank for maintaining the pressure therein, substantially constant.

11. The combination with a water wheel and a nozzle therefor, of means operated by variations in speed of the wheel for varying the amount of water discharged against the wheel to maintain the speed of the wheel substantially constant, a tank containing liquid under pressure connected to said water discharge varying means, a pump for introducing liquid into said tank, a float arranged to be moved by variations of the level of the liquid in the said tank, and means operative by the movement of the float for varying the speed of said pump.

12. The combination with a water wheel and a nozzle therefor, of a needle in said nozzle adapted to vary the size of the jet discharging therefrom, a piston attached to said needle, a cylinder in which said piston is disposed, a governor connected to the wheel, a valve operated by said governor, conductors connecting said valve with the opposite ends of said cylinder, a tank arranged to contain liquid under pressure, a conductor extending from said tank to said valve, a pump for introducing liquid under pressure into said tank, a float arranged to be moved by variations in the level of the liquid in said tank, and means operative by the movement of said float for varying the speed of said pump.

13. The combination with a vessel adapted to contain liquid under pressure, of mechanism adapted to be operated by said liquid, a conductor connecting said mechanism with said vessel below the level of the liquid therein, means for introducing liquid into said vessel, a float arranged to be moved by variations in the level of the liquid in said vessel, and means operative by the movement of the float for varying the rate at which the liquid is introduced whereby the pressure of the liquid in said vessel remains substantially constant.

14. The combination with a vessel adapted to contain liquid under pressure, of a float chamber connected to said vessel, an open top float in said chamber, an open ended cylinder arranged in said liquid, a piston disposed in said cylinder and secured to said float, and ports in said cylinder arranged to be opened and closed by said piston.

15. The combination with a vessel adapted to contain a liquid under pressure, of a float chamber connected to said vessel, an open top, closed bottom float in said chamber, a conductor depending into said float and terminating exteriorly of the float chamber, and a valve in said conductor.

16. The combination with a vessel adapted to contain liquid under pressure, of mechanism adapted to be operated by the flow of said liquid, a pump for introducing liquid into said vessel, and means operative by variations of the level of the liquid in said vessel to vary the speed of said pump so that the level of the liquid in the vessel remains substantially constant.

17. The combination with a vessel adapted to contain liquid under pressure, of mechanism adapted to be operated by the flow of said liquid from said vessel, a pump for introducing liquid into said vessel, a water wheel arranged to drive said pump, and means operative by variations of the level of the liquid in said vessel for varying the amount of water discharged against the water wheel.

18. The combination with a vessel adapted to contain liquid under pressure, of mechanism adapted to be operated by the flow of said liquid from said vessel, a pump for introducing liquid into said vessel, a water wheel arranged to drive said pump, a float arranged to be moved by variations in the level of the liquid in said vessel, and means operative by the movement of the float for varying the amount of water discharged against the water wheel.

19. The combination with a vessel adapted to contain liquid under pressure, of mechanism adapted to be operated by the flow of said liquid from said vessel, a pump for introducing liquid into said vessel, a water wheel arranged to drive said pump, a nozzle for said wheel, means for controlling the amount of water discharged from said nozzle against the wheel, a float arranged to be moved by variations in the level of said liquid, a conduit connecting said vessel and nozzle controlling means, and means attached to said float for controlling the flow of liquid through said conduit.

20. The combination with a vessel adapted to contain liquid under pressure, of mechanism adapted to be operated by the flow of said liquid from said vessel, a pump for introducing liquid into said vessel, a water wheel arranged to drive said pump, a nozzle for said wheel, means for controlling the amount of water discharged from the nozzle against said wheel, a float arranged to be moved by variations of the level of the liquid in said vessel, a piston secured to said float, a cylinder in which said piston is disposed arranged in communication with said liquid under pressure, ports in said cylinder, and conductors connecting said ports with the nozzle controlling means, whereby the speed of the water wheel is varied in accordance with variations of the level of the liquid in said vessel.

21. The combination with a vessel adapted to contain liquid under pressure of mechanism adapted to be operated by said liquid, a conductor connecting said mechanism with said vessel below the level of the liquid therein, a pump for introducing liquid into the vessel and means for automatically varying the speed of the pump so that liquid is introduced into the vessel at substantially the same rate as it discharges therefrom, so that the pressure in the vessel remains substantially constant.

In testimony whereof, I have hereunto set my hand at San Francisco, California, this 6th day of March, 1914.

LEOPOLD M. KARNASCH.

In presence of—
  H. G. PROST,
  M. LE CONTE.